(12) United States Patent
Ryu et al.

(10) Patent No.: US 8,755,076 B2
(45) Date of Patent: *Jun. 17, 2014

(54) METHOD AND APPARATUS OF PROCESSING WIRELESS PRINTING BASED ON WIRELESS LAN

(75) Inventors: Seok Ryu, Suwon-si (KR); Kwang-chul Lee, Suwon-si (KR); Eun-Hee Rhim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,389

(22) Filed: Aug. 13, 2012

(65) Prior Publication Data
US 2012/0307307 A1   Dec. 6, 2012

Related U.S. Application Data (63) Continuation of application No. 11/106,650, filed on Apr. 15, 2005, now Pat. No. 8,264,712.

(30) Foreign Application Priority Data

Jul. 6, 2004  (KR) .................. 10-2004-0052309

(51) Int. Cl.
*G06F 3/12* (2006.01)
(52) U.S. Cl.
USPC ............ 358/1.15; 348/207.2; 348/211.2
(58) Field of Classification Search
USPC ............................... 348/207.2, 211.2
See application file for complete search history.

(56) References Cited

U.S. PATENT DOCUMENTS

| 5,636,333 | A | * | 6/1997 | Davidson et al. ............. 358/1.15 |
| 5,909,545 | A | * | 6/1999 | Frese et al. .................... 709/208 |
| 6,003,084 | A | * | 12/1999 | Green et al. ................... 709/203 |
| 6,431,772 | B1 | * | 8/2002 | Melo et al. .................... 358/1.15 |
| 6,442,145 | B1 | * | 8/2002 | De Lange et al. ............. 370/310 |
| 6,701,058 | B1 | | 3/2004 | Tsubaki |
| 6,909,708 | B1 | * | 6/2005 | Krishnaswamy et al. .... 370/352 |
| 7,014,374 | B2 | * | 3/2006 | Hamaguchi et al. ......... 358/1.15 |
| 7,089,298 | B2 | * | 8/2006 | Nyman et al. ................ 709/220 |

(Continued)

FOREIGN PATENT DOCUMENTS

| CN | 1343063 A | 4/2002 |
| JP | 2002-345027 A | 11/2002 |

(Continued)

OTHER PUBLICATIONS

ISO/IEC 7498-1, Information Technology—Open Systems Interconnection—Basic Referecne Model: The Basic Model, Jun. 15, 1996, Second Edition (corrected), Particulary pp. 28-30.*

(Continued)

*Primary Examiner* — Barbara Reinier
*Assistant Examiner* — Nicholas Pachol
(74) *Attorney, Agent, or Firm* — Sughrue Mion, PLLC (57) ABSTRACT

Provided are a wireless printing system and method based on wireless Local Area Network (LAN). A method of requesting a wireless printing, includes: requesting a printer that exists in a wireless LAN to perform a print job; and communicating with the printer according to a standard of the wireless LAN in order to transmit data regarding the print job to the printer. The method provides wireless direct printing suitable for a wireless LAN environment.

10 Claims, 7 Drawing Sheets

(56) References Cited

U.S. PATENT DOCUMENTS

| | | |
|---|---|---|
| 7,116,661 B2 | 10/2006 | Patton |
| 7,145,898 B1 * | 12/2006 | Elliott ........................ 370/352 |
| 7,170,857 B2 * | 1/2007 | Stephens et al. ............ 370/230 |
| 7,199,895 B2 * | 4/2007 | Collier et al. ............... 358/1.15 |
| 7,299,490 B2 * | 11/2007 | Berkema et al. ................ 726/2 |
| 7,385,721 B2 * | 6/2008 | Shahindoust ............... 358/1.15 |
| 7,400,421 B2 * | 7/2008 | Endo et al. ................. 358/1.13 |
| 7,403,300 B2 * | 7/2008 | Shahindoust ............... 358/1.15 |
| 7,426,051 B2 * | 9/2008 | Endo et al. ................. 358/1.15 |
| 2002/0064149 A1 * | 5/2002 | Elliott et al. ................ 370/400 |
| 2002/0078118 A1 * | 6/2002 | Cone et al. .................. 709/101 |
| 2002/0141405 A1 * | 10/2002 | Bouet .......................... 370/389 |
| 2002/0143960 A1 * | 10/2002 | Goren et al. ................ 709/229 |
| 2002/0188656 A1 * | 12/2002 | Patton et al. ............... 709/201 |
| 2002/0196789 A1 * | 12/2002 | Patton ......................... 370/400 |
| 2002/0198994 A1 * | 12/2002 | Patton et al. ............... 709/225 |
| 2003/0078965 A1 * | 4/2003 | Cocotis et al. .............. 709/203 |
| 2003/0079030 A1 * | 4/2003 | Cocotis et al. .............. 709/229 |
| 2003/0093529 A1 * | 5/2003 | Simpson et al. ............ 709/226 |
| 2003/0156567 A1 * | 8/2003 | Oak ............................. 370/338 |
| 2003/0172127 A1 * | 9/2003 | Northrup et al. ............ 709/219 |
| 2004/0021902 A1 * | 2/2004 | Ogiwara et al. ............ 358/1.15 |
| 2004/0041865 A1 | 3/2004 | Yano et al. |
| 2004/0046990 A1 * | 3/2004 | Yano et al. .................. 358/1.15 |
| 2004/0070672 A1 * | 4/2004 | Iwami et al. ................ 348/207.2 |
| 2004/0131078 A1 * | 7/2004 | Gupta et al. ................. 370/466 |
| 2004/0179103 A1 * | 9/2004 | Endo et al. .................. 348/207.2 |
| 2004/0179105 A1 * | 9/2004 | Endo et al. .................. 348/211.1 |
| 2004/0196506 A1 * | 10/2004 | Izumi et al. .................. 358/402 |
| 2004/0252335 A1 * | 12/2004 | Yano et al. .................. 358/1.15 |
| 2004/0258143 A1 * | 12/2004 | Jones et al. .................. 375/222 |
| 2005/0055465 A1 * | 3/2005 | Sato ............................. 709/248 |
| 2005/0083894 A1 * | 4/2005 | Tagawa ....................... 370/338 |
| 2005/0111030 A1 * | 5/2005 | Berkema et al. ............ 358/1.15 |
| 2005/0170774 A1 * | 8/2005 | Shiohara et al. ............ 455/11.1 |

FOREIGN PATENT DOCUMENTS

| | | |
|---|---|---|
| JP | 2003-209782 A | 7/2003 |
| KR | 1999-0077216 A | 10/1999 |
| KR | 2003-0069447 A | 8/2003 |
| KR | 10-2004-0022349 A | 3/2004 |
| WO | 97/26721 A2 | 7/1997 |

OTHER PUBLICATIONS

ISO/IEC 7498-1, Information Technology—Open Systems Interconnection—Basic Reference Model: The Basic Model, Jun. 15, 1996, Second Edition (corrected), Particularly pp. 28-30.

* cited by examiner

METHOD AND APPARATUS OF PROCESSING WIRELESS PRINTING BASED ON WIRELESS LAN

This application is a Continuation application of application Ser. No. 11/106,650, filed Apr. 15, 2005, which claims priority from Korean Patent Application No. 10-2004-0052309, filed on Jul. 6, 2004, in the Korean Intellectual Property Office, the disclosure of which is incorporated herein in its entirety by reference.

BACKGROUND OF THE INVENTION

1. Field of the Invention

The present invention relates to a wireless printing system and method based on a wireless Local Area Network (LAN), and more particularly, to a printing client and a printing server.

2. Description of the Related Art

As digital cameras become more widely used, the demand for printing digital photos increases. In a conventional method, a digital camera is connected to a computer to print a digital photo using a printer connected to the computer. A new method in which a digital camera is directly connected to a printer to print a digital photo has also appeared. This new method is referred to as direct printing. Direct printing uses the PictBridge standard, which uses a Universal Serial Bus (USB), and a Bluetooth Basic Image Profile/Basic Print Profile (BIP/BPP), which uses Bluetooth.

Figure 1:
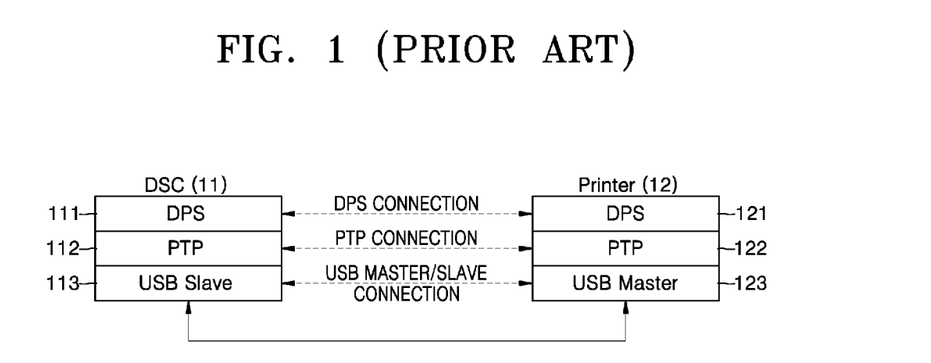
FIG. 1 illustrates the protocol stack of a conventional PictBridge protocol.

FIG. 1 illustrates a protocol stack used by the PictBridge standard. Referring to FIG. 1, the protocol stack is divided into a protocol stack embedded in a Digital Still Camera (DSC) 11 and a protocol stack embedded in a printer 12. The protocol stack embedded in the DSC 11 comprises a Digital Photo Solution (DPS) layer 111, a Picture Transfer Protocol (PTP) layer 112, and a USB slave layer 113. The protocol stack embedded in the printer 12 comprises a DPS layer 121, a PTP layer 122, and a USB master layer 123.

Figure 2:
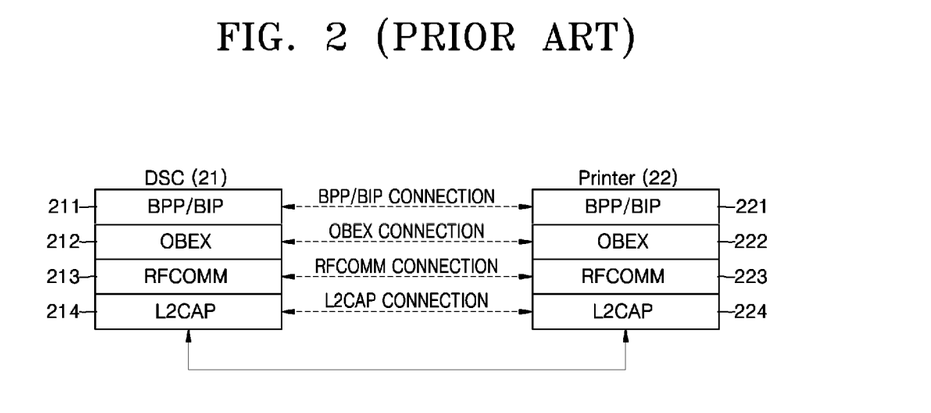
FIG. 2 illustrates the protocol stack of a conventional Bluetooth BIP/BPP protocol.

FIG. 2 illustrates the protocol stack of a conventional Bluetooth BIP/BPP. Referring to FIG. 2, the protocol stack of a Bluetooth BIP/BPP is divided into a protocol stack embedded in a DSC 21 and a protocol stack embedded in a printer 22. The protocol stack embedded in the DSC 21 comprises a BPP/BIP layer 211, an Object Exchange (OBEX) layer 212, a Radio Frequency Communication (RFCOMM) layer 213, and a Logical Link Control and Adaptation Protocol (L2CAP) layer 214. The protocol stack embedded in the printer 22 comprises a BPP/BIP layer 221, an OBEX layer 222, a RFCOMM layer 223, and a L2CAP layer 224.

As described above, PictBridge is a wired direct printing protocol using USB. USB products have already been released in the market. However, USB products are not suitable for the present wireless environment.

Bluetooth BIP/BPP is a wireless direct printing protocol using Bluetooth, which has a limited wireless communication area. As shown in FIG. 2, Bluetooth BIP/BPP has its own protocol system, which is different from PictBridge, and thus, is not compatible with the general-purpose PictBridge protocol. Also, since Bluetooth BIP/BPP is based on an Extensible HyperText Markup Language (XHTML), an Extensible Markup Language (XML), and an Internet Printing Profile (IPP), it is suitable for printing a general file. However, it is not suitable for printing a digital photo.

SUMMARY OF THE INVENTION

The present invention provides apparatuses and methods that make wireless direct printing possible in the present wireless LAN environment.

The present invention also provides a computer readable medium having embodied thereon a computer program for executing the methods.

According to an aspect of the present invention, there is provided a method of requesting wireless printing, comprising: requesting a printer that exists in a wireless Local Area Network (LAN) to print a print job; and communicating with the printer according to a wireless LAN standard in order to transmit data regarding the print job to the printer.

According to another aspect of the present invention, there is provided a mobile station, comprising: a print job requesting unit requesting a printer that exists in a wireless LAN to print a print job; and a wireless LAN communicating unit communicating with the printer according to a wireless LAN standard in order to transmit data regarding a print job requested by the print job requesting unit.

According to still another aspect of the present invention, there is provided a method of performing wireless printing, comprising:
performing communication with a mobile station in a wireless LAN, according to a wireless LAN standard; and processing a print job requested by the mobile station through the communication.

According to yet another aspect of the present invention, there is provided a printer, comprising: a wireless LAN communicating unit communicating with a mobile station in a wireless LAN according to a wireless LAN standard; and a print job processing unit processing a print job requested from the mobile station through communication in the wireless LAN communicating unit.

According to a further aspect of the present invention, there is provided a protocol stack, comprising: an application layer executing application software regarding a print job; and a wireless LAN layer, which is lower than the print application layer, processing an IEEE 802.11-based wireless LAN communication regarding the print job.

According to a further aspect of the present invention, there is provided a computer readable medium having embodied thereon a computer program for executing the method of requesting wireless printing.

According to a further aspect of the present invention, there is provided a computer readable medium having embodied thereon a computer program for executing the method of processing wireless printing.

BRIEF DESCRIPTION OF THE DRAWINGS

The above aspects and advantages of the present invention will become more apparent by describing in detail an exemplary embodiment thereof with reference to the attached drawings in which.

DETAILED DESCRIPTION OF THE INVENTION

The present invention will now be described more fully with reference to the accompanying drawings, in which preferred embodiments of the invention are shown.

Figure 3:
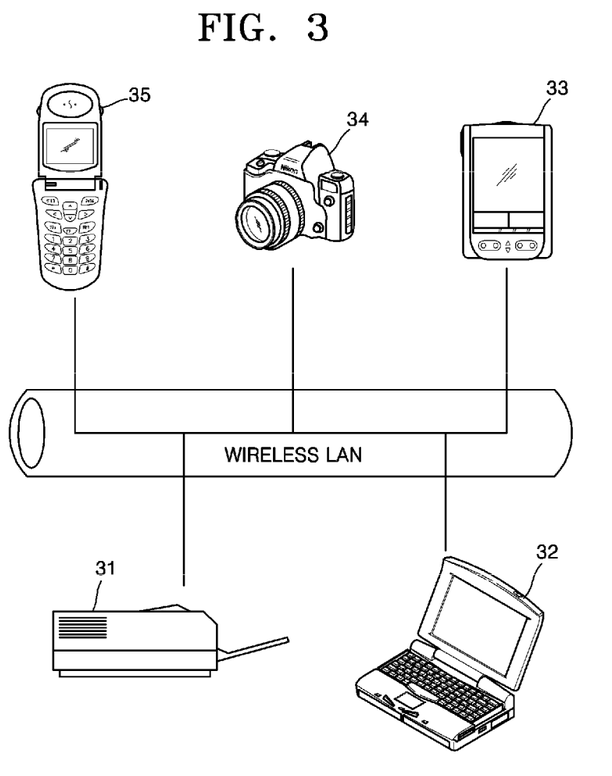
FIG. 3 illustrates a wireless Local Area Network (LAN) environment to which embodiments of the present invention are applicable.

FIG. 3 illustrates a wireless local area network (LAN) environment to which embodiments of the present invention are applicable. Referring to FIG. 3, the wireless LAN environment to which embodiments below are applicable comprises a printer 31, a notebook computer 32, a Personal Digital Assistant (PDA) 33, a digital camera 34, and a cellular phone 35, which are connected through a wireless LAN.

The wireless LAN environment is based on the wireless LAN operating in an infrastructure mode or an ad-hoc mode in the Institute of Electrical and Electronics Engineers (IEEE) 802.11 standard. The wireless LAN operating in an infrastructure mode is referred to as a Basic Service Set (BSS) comprising an Access Point (AP) and mobile stations. In the meantime, the wireless LAN operating in an ad-hoc mode is referred to as a BSS comprising mobile stations only. A mobile station in the infrastructure mode should communicate with other mobile stations through an AP, whereas, a mobile station in the ad-hoc mode is able to directly communicate with other mobile stations.

In the wireless LAN environment, the printer 31 may be an AP or a mobile station. When the printer 31 is an AP, the printer should be connected to a wired network and thus has limited mobility. In the wireless LAN environment, the notebook computer 32, the PDA 33, the digital camera 34, and the cellular phone 35 are mobile stations.

Figure 4:
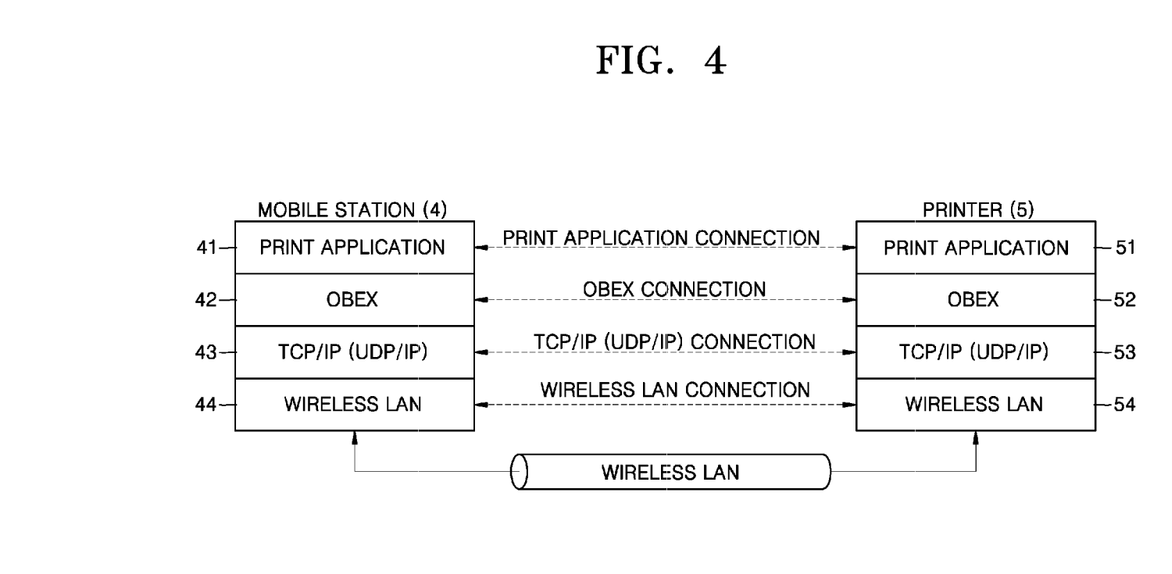
FIG. 4 illustrates a protocol stack according to an embodiment of the present invention.

FIG. 4 illustrates a protocol stack according to an embodiment of the present invention. Referring to FIG. 4, a protocol stack according to the present embodiment is divided into a protocol stack embedded in a mobile station 4 and a protocol stack embedded in a printer 5. The protocol stack embedded in the mobile station 4 comprises a print application layer 41, an Object Exchange (OBEX) layer 42, a Transmission Control Protocol/Internet Protocol (TCP/IP) (User Datagram Protocol/Internet Protocol (UDP/IP)) layer 43, and a wireless LAN layer 44. The protocol stack embedded in the printer 5 comprises a print application layer 51, an OBEX layer 52, a TCP/IP (UDP/IP) layer 53, and a wireless LAN layer 54. In the same manner as a general protocol stack, the two protocol stacks according to the present embodiment each have a number of independent layers and the corresponding layers having the same protocol are connected to each other.

The print application layers 41 and 51 process application software regarding a print job. In the present embodiment, a Digital Photo Solution (DPS) is embedded in the print application layers 41 and 51 in order to support compatibility with the PictBridge protocol. Other application software, such as a Basic Image Profile/Basic Print Profile (BIP/BPP), may also be embedded.

The OBEX layers 42 and 52, which are lower than the print application layers 41 and 51, process an object exchange regarding a print job. OBEX is a protocol that allows a wide range of devices to exchange data using a simple method, which is specified by the Infrared Data Association (IrDA). However, the OBEX protocol is widely used in fields other than an infrared communication. As described above, the Bluetooth BIP/BPP has selected the OBEX protocol, which is selected in the present embodiment because of the above reasons. An OBEX protocol object can be one of a wide range of objects including a file, diagnostic information, an electronic card, etc.

The TCP/IP (UDP/IP) layers 43 and 53, which are lower than the OBEX layers 42 and 52, process a TCP/IP communication or a UDP/IP communication regarding a print job. TCP/IP transmits and receives data only when the mobile station 4 and the printer 5 are firmly connected to each other, thereby guaranteeing there is no loss of data. Meanwhile, UDP/IP does not check if the mobile station 4 and the printer 5 are connected to each other and if there is any loss of data. Naturally, UDP/IP processes data faster than TCP/IP.

The wireless LAN layers 44 and 54, which are lower than the TCP/IP (UDP/IP) layers 43 and 53, process an IEEE 802.11-based wireless LAN communication regarding a print job.

Figure 5:
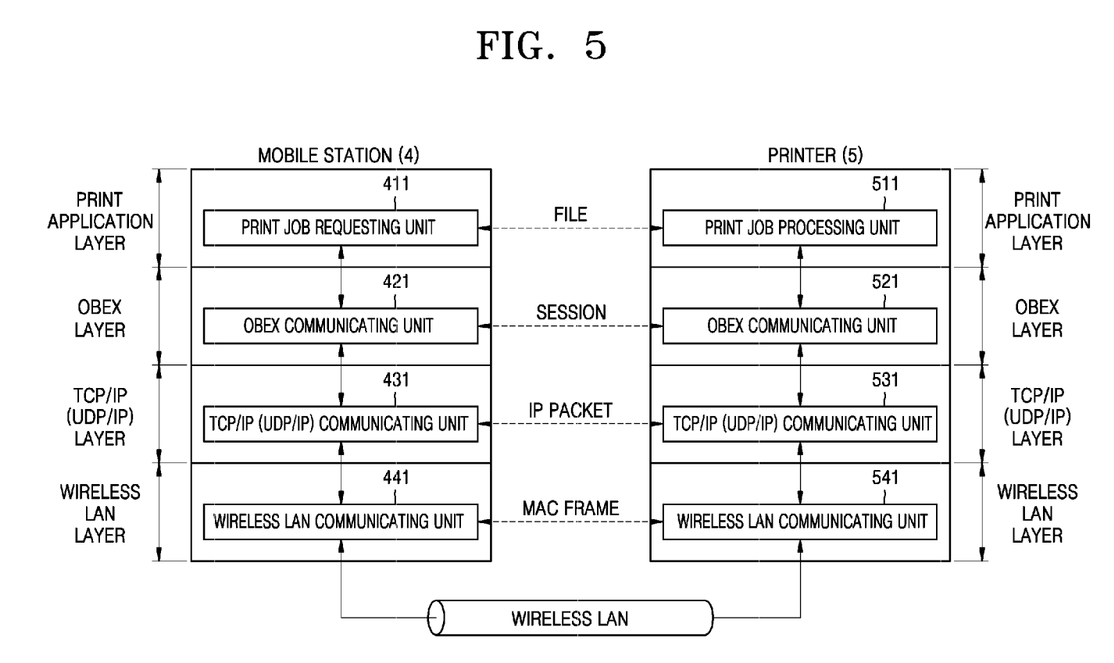
FIG. 5 illustrates the configuration of a wireless printing system according to an embodiment of the present invention.

FIG. 5 illustrates the configuration of a wireless printing system according to an embodiment of the present invention. Referring to FIG. 5, a wireless printing system according to the present embodiment comprises a mobile station 4 and a printer 5. The wireless printing system is a Basic Service Set (BSS) of the IEEE 802.11 standard, and can include mobile stations other than the mobile station 4.

The mobile station 4 according to the present embodiment comprises a print job requesting unit 411, an OBEX communicating unit 421, a TCP/IP (UDP/IP) communicating unit 431, and a wireless LAN communicating unit 441.

The print job requesting unit 411 is embedded in the print application layer 41 of the protocol stacks shown in FIG. 4, and requests the printer 5, which exists in a wireless LAN, to perform a print job, according to DPS. To be more specific, the print job requesting unit 411 obtains information on printer performance according to DPS, and transmits data regarding a print job based on the obtained information in order to request the print job. This will be described in detail with reference to FIG. 6. The print job requesting unit 411 prepares data regarding a print job as a file in order to request a print job. This will be described in detail with reference to FIG. 7. As described above, the print job requesting unit 411 may request the printer 5, which exists in a wireless LAN to perform a print job, according to different application software, such as BIP/BPP.

The OBEX communicating unit 421 is embedded in the OBEX layer 42 of the protocol stacks shown in FIG. 4, and performs communication with the printer 5 according to the OBEX protocol. To be more specific, the OBEX communicating unit 421 generates a session in order to transmit data regarding a print job requested in the print job requesting unit 411, and transmits data regarding the requested print job while the generated session is maintained in order to communicate with the printer 5. The OBEX communicating unit 421 transmits a file prepared in the print job requesting unit 411 to the printer 5 according to an object exchange procedure in the OBEX protocol in order to communicate with the printer 5. This will be described in detail with reference to FIG. 7.

The TCP/IP (UDP/IP) communicating unit 431 is embedded in the TCP/IP (UDP/IP) layer 43 of the protocol stacks shown in FIG. 4, and performs communication with the printer 5 according to the TCP/IP or UDP/IP protocol. To be more specific, the TCP/IP (UDP/IP) communicating unit 431 generates an IP packet that includes data transmitted while the session generated in the OBEX communicating unit 421 is maintained, and transmits the IP packet in order to communicate with the printer 5. This will be described in detail with reference to FIG. 8.

The wireless LAN communicating unit 441 is embedded in the wireless LAN layer 44 among the protocol stacks shown in FIG. 4, and performs communication with the printer 5 according to the IEEE 802.11 standard. To be more specific, the wireless LAN communicating unit 441 generates a MAC frame that includes the IP packet transmitted in the TCP/IP (UDP/IP) communicating unit 431, and transmits the generated MAC frame in order to communicate with the printer 5.

The printer 5 according to the present embodiment comprises a print job processing unit 511, an OBEX communicating unit 521, a TCP/IP (UDP/IP) communicating unit 531, and a wireless LAN communicating unit 541.

The wireless LAN communicating unit 541 is embedded in the wireless LAN layer 54 of the protocol stacks shown in FIG. 4, and communicates with the mobile station 4 according to the IEEE 802.11 standard. To be more specific, the wireless LAN communicating unit 541 receives a MAC frame that includes data regarding a print job from the mobile station 4, and extracts an IP packet from the received MAC frame in order to communicate with the mobile station 4.

The TCP/IP (UDP/IP) communicating unit 531 is embedded in the TCP/IP (UDP/IP) layer 53 of the protocol stacks shown in FIG. 4, and communicates with the mobile station 4 according to the TCP/IP or UDP/IP protocol. To be more specific, the TCP/IP (UDP/IP) communicating unit 531 extracts a TCP payload or a UDP payload from the IP packet extracted by the wireless LAN communicating unit 541, and extracts data regarding a print job from the extracted TCP payload or UDP payload in order to communicate with the mobile station 4. This will be described in detail with reference to FIG. 8.

The OBEX communicating unit 521 is embedded in the OBEX layer 52 of the protocol stacks shown in FIG. 4, and communicates with the mobile station 4 according to the OBEX protocol. To be more specific, the OBEX communicating unit 521 generates a session in order to receive data regarding a print job extracted in the TCP/IP (UDP/IP) communicating unit 531, and receives data regarding the print job while the generated session is maintained in order to communicate with the mobile station 4. The OBEX communicating unit 521 receives a file prepared in the print job requesting unit 411 having data regarding a print job from the mobile station 4 according to an object exchange procedure in the OBEX protocol in order to communicate with the mobile station 4. This will be described in detail with reference to FIG. 7.

The print job processing unit 511 is embedded in the print application layer 51 of the protocol stacks shown in FIG. 4, and processes a print job requested from the mobile station 4 according to DPS. To be more specific, the print job processing unit 511 processes data regarding the received data while the session generated in the OBEX communicating unit 521 is maintained in order to perform a print job. That is, the print job processing unit 511 processes a file received in the OBEX communicating unit 521 in order to perform a print job. This will be described in detail with reference to FIG. 7. The print job processing unit 511 prints data regarding a print job according to DPS, and transmits the printed result to the mobile station 4 in order to perform a print job. This will be described in detail with reference to FIG. 6.

Figure 6:
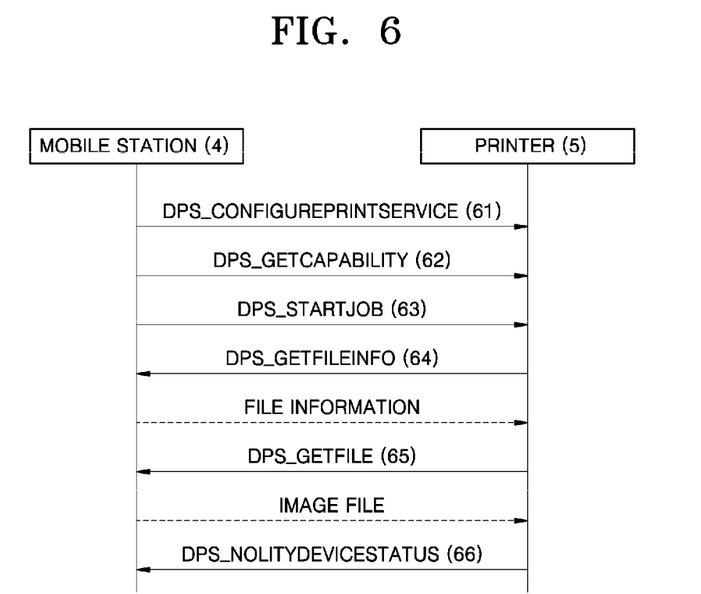
FIG. 6 is a flowchart describing the operation of application software regarding a print job embedded in the print application layers 41 and 51 in FIG. 4.

FIG. 6 is a flowchart describing the operation of application software regarding a print job, which is embedded in the print application layers 41 and 51 in FIG. 4. Referring to FIG. 6, the operation of application software regarding a print job, which is embedded in the print application layers 41 and 51 in FIG. 4 comprises the operations below. The execution of application software regarding a print job is realized as the print job requesting unit 411 and the print job processing unit 511.

The print job requesting unit 411 issues a DPS_ConfigurePrintService operation (Operation 61). Using the DPS_ConfigurePrintService operation, the mobile station 4 recognizes the printer 5, and the mobile station 4 and the printer 5 are connected as a client and a server. The present embodiment can locate the printer 5 using a technology such as a Multicast Domain Name System (DNS).

The print job requesting unit 411 issues a DPS_GetCapability operation (Operation 62). Using the DPS_GetCapability operation, the mobile station 4 inquires about the performance of the printer 4, and obtains information on the performance of the printer 5. The user selects a desired option based on the information on the performance of the printer 5, and initializes a print job.

The print job requesting unit 411 issues a DPS_StartJob operation (Operation 63). Using the DPS_StartJob operation, the mobile station 4 instructs the printer 5 to start a print job.

The print job processing unit 511 issues a DPS_GetFileInfo operation (Operation 64). Using the DPS_GetFileInfo operation, the printer 5 searches the details of an image file, and obtains the details of the image file.

The print job processing unit 511 issues a DPS_GetFile operation (Operation 65). Using the DPS_GetFile operation, the printer 5 obtains an image file based on the details of the image file.

The print job processing unit 511 issues a DPS_NotifyDeviceStatus operation (Operation 66). Using the DPS_NotifyDeviceStatus operation, the printer 5 informs the mobile station 4 of the result of a print job.

Figure 7:
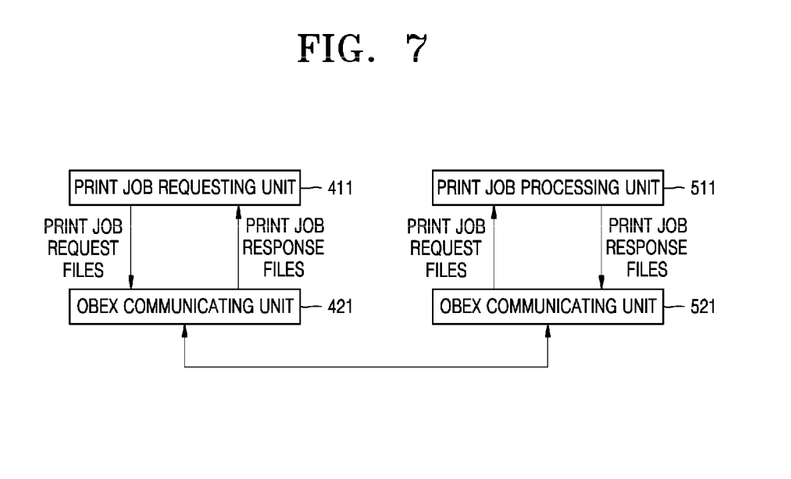
FIG. 7 illustrates transmission/reception of files generated during operation of the application software in FIG. 6.

FIG. 7 illustrates the transmission/reception of files during the executing of the application software in FIG. 6. Referring to FIG. 7, files transmitted/received during the operating of the application software in FIG. 6 are divided into a print job request and a print job response. The transmission/reception of files during the executing of the application software in FIG. 6 is realized as transmission/reception among a print job requesting unit 411, an OBEX communicating unit 421, a print job processing unit 511, and an OBEX communicating unit 521. To simplify the description, layers lower than the OBEX layer are left out of FIG. 7.

The print job requesting unit 411 transmits files relating to a print job request among the files transmitted/received during the operating of the application software in FIG. 6 to the OBEX communicating unit 421 in order to request a print job.

The OBEX communicating unit 421 receives files relating to a print job request from the print job requesting unit 411, and transmits the received files to the OBEX communicating unit 521 according to an object exchange procedure in the OBEX protocol in order to perform communication with the printer 5. The OBEX communicating unit 421 actually performs communication with the printer 5 through layers lower than the OBEX layer as described above.

The OBEX communicating unit 521 receives files relating to a print job request from the OBEX communicating unit 421 according to an object exchange procedure in the OBEX protocol, and transmits the received files to the print job processing unit 511 in order to perform communication with the mobile station 4. The OBEX communicating unit 521 actually performs communication with the mobile station 4 through layers lower than the OBEX layer as described above.

The print job processing unit 511 transmits files relating to a print job response among the files transmitted/received during the operating of the application software in FIG. 6 to the OBEX communicating unit 521 in order to process a print job. To be more specific, the print job processing unit 511 receives files relating to a print job request from the OBEX communicating unit 521, processes the received files suitably for their purposes, generates files relating to a print job response reflecting the processed result, and transmits the generated files to the OBEX communicating unit 521 in order to process a print job.

The OBEX communicating unit 521 receives files relating to a print job response from the print job processing unit 511, and transmits the received files to the OBEX communicating unit 421 according to an object exchange procedure in the OBEX protocol in order to perform communication with the mobile station 4. The OBEX communicating unit 521 actually performs communication with the mobile station 4 through layers lower than the OBEX layer as described above.

The OBEX communicating unit 421 receives files relating to a print job response from the OBEX communicating unit 521 according to an object exchange procedure in OBEX, and transmits the received files to the print job requesting unit 411 in order to perform communication with the mobile station 4. The OBEX communicating unit 421 actually performs communication with the printer 5 through layers lower than the OBEX layer as described above.

The print job requesting unit 411 receives files relating to a print job response from the OBEX communicating unit 421, and directs the received files to the user so the user can recognize the end state of a print job.

Figure 8:
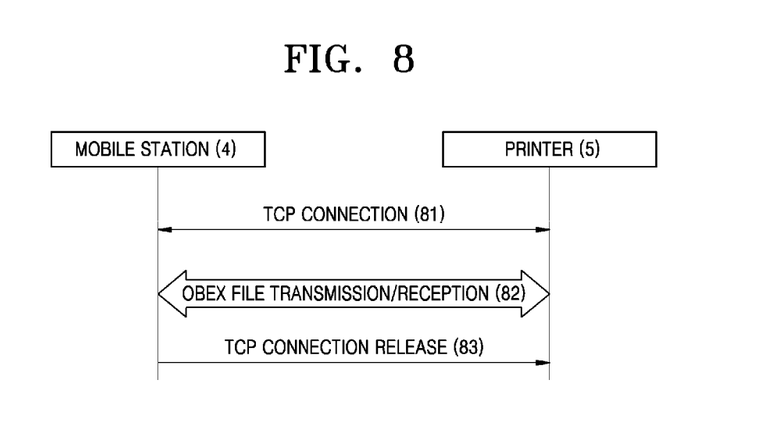
FIG. 8 is a flowchart describing operations in a Transmission Control Protocol/Internet Protocol (TCP/IP) layer relating to the file transmission/reception in FIG. 7.

FIG. 8 is a flowchart describing operations in a TCP/IP layer related to the file transmission/reception in FIG. 7. Referring to FIG. 8, operations in a TCP/IP layer related to the file transmission/reception in FIG. 7 comprises the operations below according to TCP. The operations in a TCP/IP layer are realized as a TCP/IP (UDP/IP) communicating unit 431 and a TCP/IP (UDP/IP) communicating unit 531.

The TCP/IP (UDP/IP) communicating unit 431 and the TCP/IP (UDP/IP) communicating unit 531 establish a TCP connection when a session between the OBEX communicating unit 421 and the OBEX communicating unit 521 is generated (Operation 81).

The TCP/IP (UDP/IP) communicating unit 431 and the TCP/IP (UDP/IP) communicating unit 531 transmit and receive files through the TCP connection according to the OBEX protocol (Operation 82).

The TCP/IP (UDP/IP) communicating unit 431 and the TCP/IP (UDP/IP) communicating unit 531 release the TCP connection when the session between the OBEX communicating unit 421 and the OBEX communicating unit 521 is terminated (Operation 83).

As described above, TCP starts communication after a session is generated, whereas, UDP starts communication without a session. Therefore, UDP is inferior to TCP in view of reliability.

Figure 9:
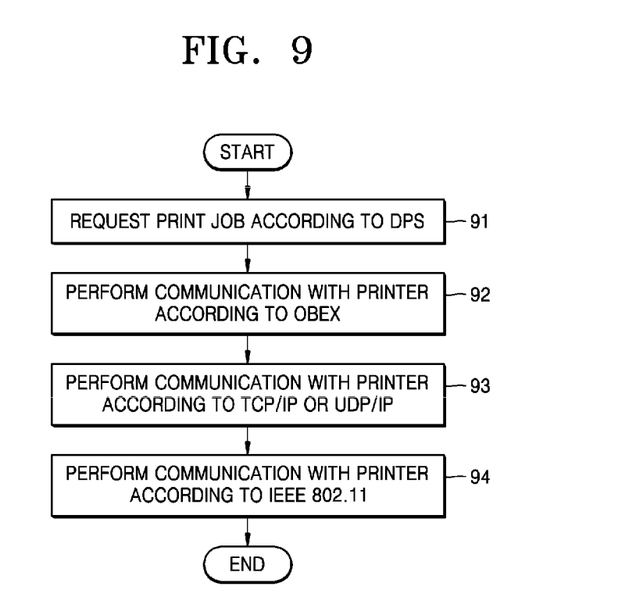
FIG. 9 is a flowchart describing a method of requesting wireless printing according to an embodiment of the present invention.

FIG. 9 is a flowchart describing a method of requesting wireless printing according to an embodiment of the present invention. Referring to FIG. 9, a method of requesting wireless printing according to an embodiment of the present invention comprises the operations below. A method of requesting wireless printing according to an embodiment of the present invention comprises time series operations processed in the mobile station 4 shown in FIG. 5. The content described regarding the mobile station 4 shown in FIG. 5 is also applied to a method of requesting wireless printing.

The mobile station 4 requests the printer 5 that exists in a wireless LAN to print a print job according to DPS (Operation 91). To be more specific, the mobile station 4 obtains information on printer performance according to DPS, and transmits data regarding a print job based on the obtained information in order to request the print job. The mobile station 4 prepares data regarding a print job as a file in order to request the print job.

The mobile station 4 performs communication with the printer 5 according to the OBEX protocol (Operation 92). To be more specific, the mobile station 4 generates a session in order to transmit data regarding a print job requested in Operation 91, and transmits data regarding the requested print job while the generated session is maintained in order to communicate with the printer 5. The mobile station 4 transmits a file prepared in Operation 91 to the printer 5 according to an object exchange procedure in the OBEX protocol in order to perform communication with the printer 5.

The mobile station 4 performs communication with the printer 5 according to the TCP/IP protocol or the UDP/IP protocol (Operation 93). To be more specific, the mobile station 4 generates an IP packet that includes data transmitted while the session generated in Operation 92 is maintained, and transmits the IP packet in order to perform communication with the printer 5.

The mobile station 4 performs communication with the printer 5 according to the IEEE 802.11 standard (Operation 94). To be more specific, the mobile station 4 generates a MAC frame that includes the IP packet transmitted in Operation 93, and transmits the generated MAC frame in order to perform communication with the printer 5.

Figure 10:
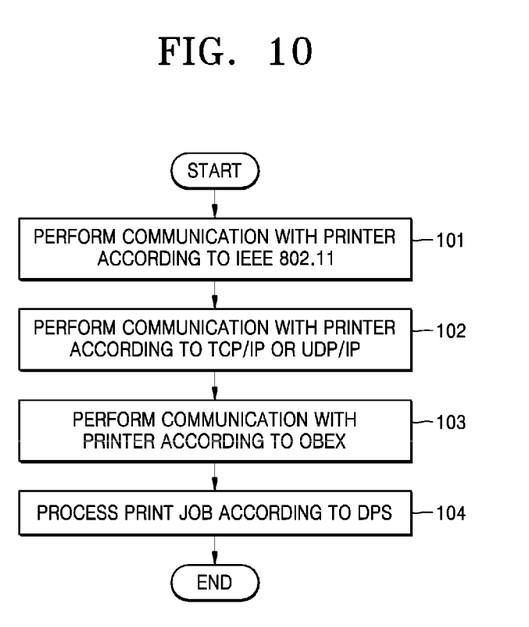
FIG. 10 is a flowchart describing a method of performing wireless printing according to an embodiment of the present invention.

FIG. 10 is a flowchart describing a method of performing wireless printing according to an embodiment of the present invention. Referring to FIG. 10, the method of processing a wireless printing comprises the operations below. The method of processing a wireless printing comprises time series operations performed in the printer 5 shown in FIG. 5. The content described regarding the printer 5 shown in FIG. 5 is also applied to a method of performing wireless printing.

The printer 5 communicates with the mobile station 4 according to the IEEE 802.11 standard (Operation 101). To be more specific, the printer 5 receives a MAC frame that includes data regarding a print job from the mobile station 4, and extracts an IP packet from the received MAC frame in order to communicate with the mobile station 4.

The printer 5 communicates with the mobile station 4 according to the TCP/IP protocol or the UDP/IP protocol (Operation 102). To be more specific, the printer 5 extracts a TCP payload or a UDP payload from the IP packet extracted in Operation 101, and extracts data regarding a print job from the extracted TCP payload or UDP payload in order to communicate with the mobile station 4.

The printer 5 communicates with the mobile station 4 according to the OBEX protocol (Operation 103). To be more specific, the printer 5 generates a session in order to receive data regarding a print job extracted in Operation 102, and receives data regarding a print job while the generated session is maintained in order to communicate with the mobile station 4. The printer 5 receives a file prepared using data regarding a print job from the mobile station 4 according to an object exchange procedure in OBEX in order to communicate with the mobile station 4.

The printer 5 processes a print job requested by the mobile station 4 according to DPS (Operation 104). To be more specific, the printer 5 processes data regarding a print job received while the session generated in Operation 103 is maintained in order to process a print job. That is, the printer 5 processes a file received in Operation 103 in order to process a print job. The printer 5 prints data regarding a print job according to DPS, and transmits the printed result to the mobile station 4 in order to process a print job.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

As described above, wireless direct printing suitable for a wireless LAN environment based on the IEEE 802.11 standard is provided. A wired PictBridge method is changed to a wireless method that is suitable for printing a digital photo. Use of the OBEX protocol results in efficient wireless printing. Also, the limited wireless communication area of Bluetooth BIP/BPP has been overcome to make wireless printing in an office possible.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of requesting wireless printing, comprising:
    generating a print job, including image data and at least one command for printing the image data, for requesting a printer that exists in a wireless LAN;
    generating a single session to transmit the print job generated by the print job requesting unit, according to a session protocol;
    generating a packet that includes the print job, according to a Transmission Control Protocol/Internet Protocol (TCP/IP); and
    transmitting a frame including the generated packet to the printer according to a wireless LAN standard, wherein the session protocol is different from the Transmission Control Protocol/Internet Protocol (TCP/IP),
    wherein the transmitting of the frame is performed by transmitting the print job including the image data and the at least one command for printing the image data to the printer while the generated single session is maintained, and
    wherein the generating of the single session is performed by generating the single session in order to transmit the print job according to the session protocol, and the print job is transmitted while the generated single session is maintained in order to perform communication with the printer.

2. The method of claim 1, wherein the transmitting of the frame is performed by generating a MAC frame that includes data regarding the print job according to an IEEE 802.11 standard, and transmitting the generated MAC frame.

3. The method of claim 1, wherein the session protocol is an Object Exchange (OBEX) protocol.

4. The method of claim 3, wherein the requesting of the print job is performed by preparing the print job as a file, and the generating of the single session is performed by transmitting the prepared file to the printer according to an object exchange procedure in the OBEX protocol.

5. The method of claim 1, wherein the requesting of the print job is performed by obtaining information on a performance of the printer according to a Digital Photo Solution (DPS), and transmitting the print job based on the obtained information.

6. The method of claim 1, wherein the generating of the packet is performed by generating an IP packet that includes the print job, according to a Transmission Control Protocol/Internet Protocol (TCP/IP) and transmitting the IP packet in order to perform communication with the printer.

7. A method of performing wireless printing, comprising:
    receiving a frame that includes a print job, including image data and at least one command for printing the image data, from a mobile apparatus in a wireless LAN according to a wireless LAN standard;
    extracting data regarding the print job from a packet included in the received frame, according to a Transmission Control Protocol/Internet Protocol (TCP/IP);
    generating a single session in order to receive the print job from the mobile apparatus, according to a session protocol; and
    processing the data regarding the print job while the generated single session is maintained, wherein the session protocol is different from the Transmission Control Protocol/Internet Protocol (TCP/IP), and wherein the processing of the data is performed by receiving the data regarding the print job from the mobile apparatus while the generated single session is maintained,
    wherein the generating of the single session is performed by generating the single session in order to receive the print job according to the session protocol, and the print job is received while the generated single session is maintained in order to communicate with the mobile apparatus.

8. The method of claim 7, wherein the receiving of the frame is performed by receiving a MAC frame that includes the print job according to the IEEE 802.11 standard, and extracting an IP packet from the received MAC frame.

9. The method of claim 7, wherein the session protocol is the OBEX protocol.

10. A non-transitory computer readable medium having a program for implementing a protocol stack, comprising:
    an application layer executing application software regarding a print job, including image data and at least one command for printing the image data;
    a session layer, which is lower than the application layer, generating a single session regarding the print job according to a session protocol;
    a TCP/IP layer, which is lower than the session layer, processing a Transmission Control Protocol/Internet Protocol (TCP/IP) communication regarding the print job while the generated single session is maintained; and
    a wireless LAN layer, which is lower than the TCP/IP layer, processing wireless LAN communication regarding the print job while the generated single session is maintained, wherein the session protocol is different from the Transmission Control Protocol/Internet Protocol (TCP/IP),
    wherein the session layer generates the single session in order to transmit the print job between two devices according to the session protocol, and the print job is transmitted while the generated single session is maintained in order to perform communication with the two devices.

* * * * *